July 23, 1929.   G. EVENO   1,722,179
BUSH FOR AXLE BOXES
Filed July 11, 1928
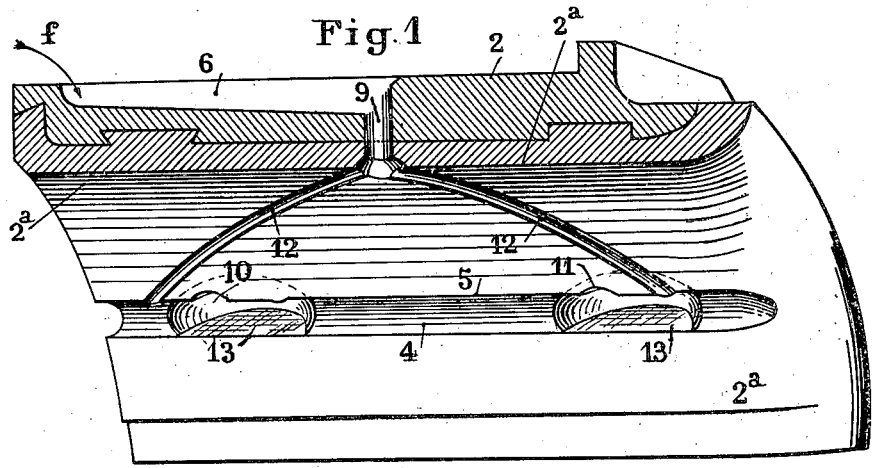
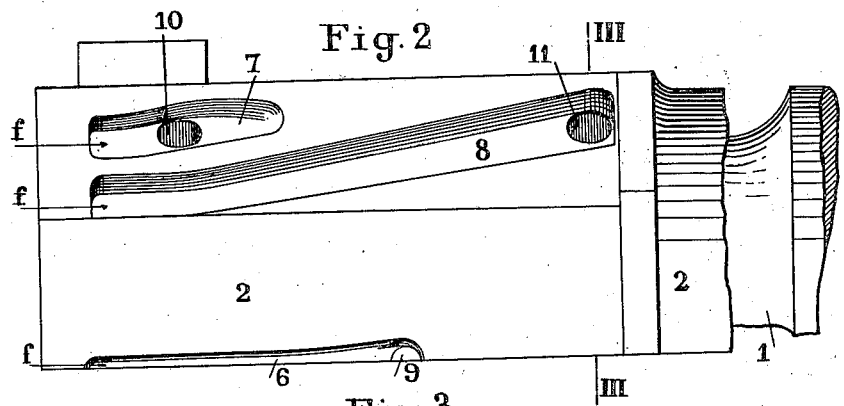
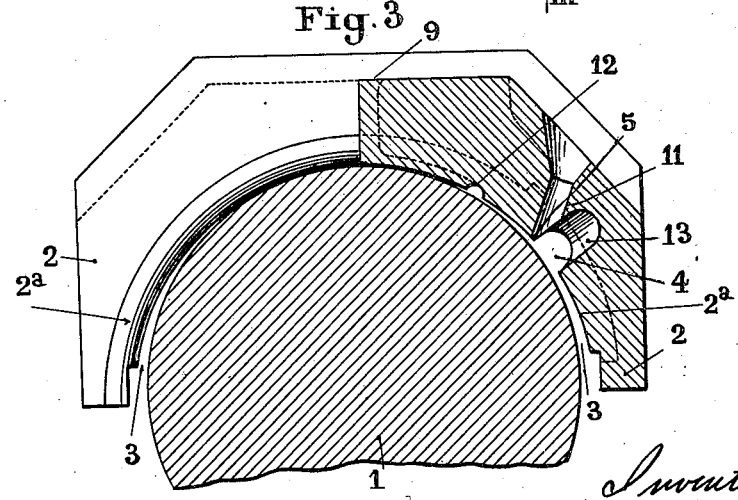

Patented July 23, 1929.

1,722,179

UNITED STATES PATENT OFFICE.

GEORGES EVENO, OF PARIS, FRANCE, ASSIGNOR TO ISOTHERMOS CORPORATION OF AMERICA, OF NEW YORK, N. Y., A CORPORATION OF DELAWARE.

BUSH FOR AXLE BOXES.

Application filed July 11, 1928. Serial No. 291,731.

This invention relates to bushes of axle boxes of the type for lubricating from above, for railway vehicles.

It is the object of the present invention to improve bushes of this type which are already in existence for the purpose of obtaining a regular and efficient lubrication along the whole length of the end of the axle even in the case where the bush is not exactly adjusted on the end of the axle as occurs in certain constructions of railways where a bush of one and the same diameter is used with axles having slightly different diameters, for the purpose of limiting the stock of replace members. But, if there is used a bush for lubricating from above in connection with the end of an axle of somewhat smaller diameter than that of the bush, there is formed at the lower portion, between the end of the axle and the bush a space which is sufficiently large to enable the oil to fall directly into the lower portion of the axle box instead of creeping between the frictional surfaces.

The device forming the subject of the present invention enables this disadvantage to be eliminated, to obtain a very regular distribution of the oil in the form of a film and to thus ensure lubrication with great security. For this purpose the conducting passages for the oil provided in the bush and its bronze lining lead to receiving and distributing passages which are provided respectively in the interior of the bush and its lining and distributed in a suitable manner at a sufficient height on the bearing surfaces and over a large portion of their width, from which the oil, by reason of linear flow or its recovery by contact, is thus conveyed over the whole length of the end of the axle in such a manner that the lubrication is effected uniformly irrespective of the relative distance of the frictional surfaces at the height of the horizontal diameter of the end of the axle. Also the novel arrangement of oil conducting passages serves to prevent static friction, that is, friction which occurs during the initial turning movement of the journal. That is to say, the novel arrangement features of the present bearing provide for holding sufficient lubricant after the journal stops rotating to furnish the required lubricant when the journal first begins to turn.

In order that the invention may be readily understood it is described hereinafter with reference to the accompanying drawings, wherein:—

Figure 1 is a perspective view of one-half of the new improved bush, without the end of the axle, assumed to be cut along its symmetrical plane.

Figure 2 is a plan view of this half bush, partly broken away so as to show the end of the axle, and Figure 3 is a view partly in cross section on the line III—III of Figure 2 passing through one of the passages for the admission of oil.

Referring to Figure 3 it will be seen that the diameter of the end of the axle 1 is somewhat smaller than that of the bush 2 so that between them, on the horizontal diameter, there is formed a space 3 through which the oil is liable to fall directly into the axle box without having fulfilled its purpose as lubricant.

The oil, which is usually projected by any suitable means and generally by propelling blades mounted on the axle against the upper internal wall of the axle box or is simply raised by these blades above the end of the axle, falls in the direction of the arrows $f$ and flows into the top supply channels 6 and side channels 7 and 8 formed in the outer periphery of the bush 2.

According to the present invention these passages lead to oil conveying passages 9, 10 and 11 which lead to collecting and distributing passages provided approximately over the whole length of the internal surface $2^a$ of the bush 2.

The opening 9 leads to grooves 12 which conduct the oil to a longitudinally disposed side draining grooves 4. The openings 10 and 11 lead directly into the draining grooves 4 at a point at which are formed deeper cavities 13 in the form of pockets.

The direction of the passages and the intersection of the different surfaces amongst themselves are selected in such a manner that the oil, arriving for example through the passage 11, follows by capillarity the various passages and reaches the draining edge 5 of the groove 4. From here it falls directly on to the axle.

The cavities or pockets 13 also serve to collect, if such should be the case, any excess oil and thus forming a reserve capable of flowing periodically on to the end of the axle either by reason of being too full or by reason of contact which may take place at this point between the internal surface 2ᵃ of the bush and the outer surface of the end of the axle.

It will be understood that without departing from the scope of the invention various modifications may be made which do not alter the essence thereof. For example the position of the branch passages 12 and the passages 10 and 11 on the surface of the bush may be modified so as to cause them to communicate with the groove 4 at points other than those indicated, or to increase the number in relation to those indicated in Figure 1. It is also possible to modify the shape of the groove 4 provided with the draining edge.

Reference has been made to the showing in Fig. 3 wherein the diameter of the end of the axle 1 is illustrated as being somewhat smaller than the diameter of the inner surface of the bearing body or bush thereby leaving the tapering spaces 3 between the inner surface of the bearing body and the axle or journal. In this connection an important phase of the invention resides in the provision which is made by this construction for maintaining a capillary film of oil in the upper part of the inner bearing face over the top part of the axle, when the car is at rest. It will be apparent that when a car, equipped with the present invention, comes to a state of rest there will necessarily have accumulated a considerable residual supply of oil in the top channels and in the passages leading off from said channels into the distributing grooves at the inner side of the bearing. Such residual oil necessarily provides a supply, particularly above the top of the axle, which will feed to the small capillary spaces at and contiguous to the top part of the axle, and provide a substantial film of oil held in place by capillary attraction, thus providing lubricant in a location which reduces the static friction to be overcome when the car is started, with the consequence of greatly easing and facilitating the starting of the car with a minimum of friction. Obviously, when the axle starts rolling the film of oil is maintained and supplied at the top of the axle until the other oil supplying and feeding means comes into play to deliver oil into the top supply channels.

I claim:—

1. A journal bearing having means for reducing static as well as sliding friction in said bearing, said means including the bearing body having upon its inner face a plurality of top and side intercommunicating distributing grooves, oil feeding passages extending from the upper face of the bearing and opening into the grooves, and upwardly extending oil cavities at the junction of the top and side passages with the grooves and having walls so disposed as to compel delivery of the oil to the axle above its horizontal center.

2. A journal bearing having means for reducing static as well as sliding friction in said bearing, said means including the bearing body having diagonally crossing distributing grooves upon its inner face longitudinally disposed draining grooves adjacent the edges of the body at the inner side thereof and communicating with the terminals of the crossing grooves, separate oil supply channels in the top of the bearing body communicating with the crossing distributing grooves and with the longitudinally disposed draining grooves.

3. A journal bearing adapted for use in connection with journals of varying diameter having means for reducing static as well as sliding friction between the journal and the bearing, said means including diagonally crossing grooves on the inner face of the bearing, said grooves terminating at a point substantially midway between the top and bottom inner face of the bearing, said bearing having a central supply channel in its upper face for supplying lubricant to the diagonally disposed grooves at their junction, side supply channels communicating with the terminals of said diagonally crossing grooves, and longitudinally disposed side draining grooves communicating with the ends of said channels and having upwardly extending oil cavities located adjacent the outlet ends of said distributing grooves.

4. A journal bearing having means for reducing static as well as sliding friction therein, said means including the bearing body having upon its inner face a plurality of side distributing grooves, oil feeding passages extending from the upper face of the bearing and opening into the grooves, and upwardly extending oil cavities at the junction of said passages with the side grooves and having walls so disposed as to compel delivery of the oil passing through said oil feeding passages to the axle above its horizontal center.

5. A journal bearing having means for reducing static as well as sliding friction therein, said means including the bearing body having upon its inner face a plurality of side distributing grooves, oil feeding passages extending from the upper face of the bearing and opening into the grooves, and upwardly extending oil cavities at the junction of said passages with the side grooves and having walls so disposed as to compel delivery of the oil passing through said oil feeding passages to the axle above its horizontal center, said cavities being of sufficient depth to extend above the outlets of said passages.

6. A journal bearing having means for reducing static as well as sliding friction therein, said means including a bearing body provided with an inner face having a greater radius than the radius of the axle to be lubricated and also having upon its inner face side distributing grooves, the upper edges of which side grooves cooperate with the surface of the axle to provide a capillary oil space and oil feeding passages extending from the upper face of the bearing and opening into the grooves.

7. A journal bearing having means for reducing static as well as sliding friction therein, said means including a bearing body provided with an inner face having a greater radius than the radius of the axle to be lubricated, and also provided with a plurality of side distributing grooves whose upper edges cooperate with the adjacent spaced surface of the axle to provide a capillary oil space for retaining the lubricant when the axle is at rest, oil feeding passages extending from the upper face of the bearing and opening into the grooves, and upwardly extending oil cavities at the junction of said passages with the side grooves and having their upper walls so disposed as to compel delivery of the oil to the said capillary space.

GEORGES EVENO.